United States Patent [19]

Paul

[11] Patent Number: 5,415,696
[45] Date of Patent: May 16, 1995

[54] METHOD FOR REMOVING ALKALINE SULFATE SCALE IN DOWNHOLE TUBULARS

[75] Inventor: James M. Paul, DeSoto, Tex.

[73] Assignee: Mobil Oil Corporation, Fairfax, Va.

[21] Appl. No.: 254,334

[22] Filed: Jun. 6, 1994

Related U.S. Application Data

[63] Continuation-in-part of Ser. No. 96,249, Jul. 26, 1993, abandoned.

[51] Int. Cl.⁶ .............................. B08B 1/04; B08B 3/08; B08B 9/00
[52] U.S. Cl. ............................. 134/8; 134/10; 134/22.1; 134/22.11; 134/22.13; 134/22.14; 134/22.16; 134/22.17; 134/22.19; 134/23; 134/32; 134/34
[58] Field of Search ............... 134/8, 22.1, 22.11, 134/22.13, 22.14, 22.16, 22.17, 22.19, 23, 32, 34, 10

[56] References Cited

U.S. PATENT DOCUMENTS

| | | | |
|---|---|---|---|
| 4,980,077 | 12/1990 | Morris et al. | 134/2 X |
| 5,049,297 | 9/1991 | Morris et al. | 252/80 |
| 5,084,105 | 1/1992 | Morris et al. | 134/3 |

OTHER PUBLICATIONS

A. D. F. Brown, S. J. Merrett, and J. S. Putman (Brown et al.), "Coil-Tubing Milling/Underreaming of Barium Sulfate Scale and Scale Control in the Forties Field", Society of Petroleum Engineers, 1991.

*Primary Examiner*—George Wyszomierski
*Assistant Examiner*—Zeinab El-Arini
*Attorney, Agent, or Firm*—Lawrence O. Miller; George W. Hager, Jr.; Alexander J. McKillop

[57] ABSTRACT

The present invention relates to a method of removing alkaline earth sulfate scale from the interior surface of downhole production tubing comprising contacting the scale with a solvent having a specific gravity of at least 1.2 while simultaneously milling the scale with a rotating mill head connected to a downhole motor.

14 Claims, 1 Drawing Sheet

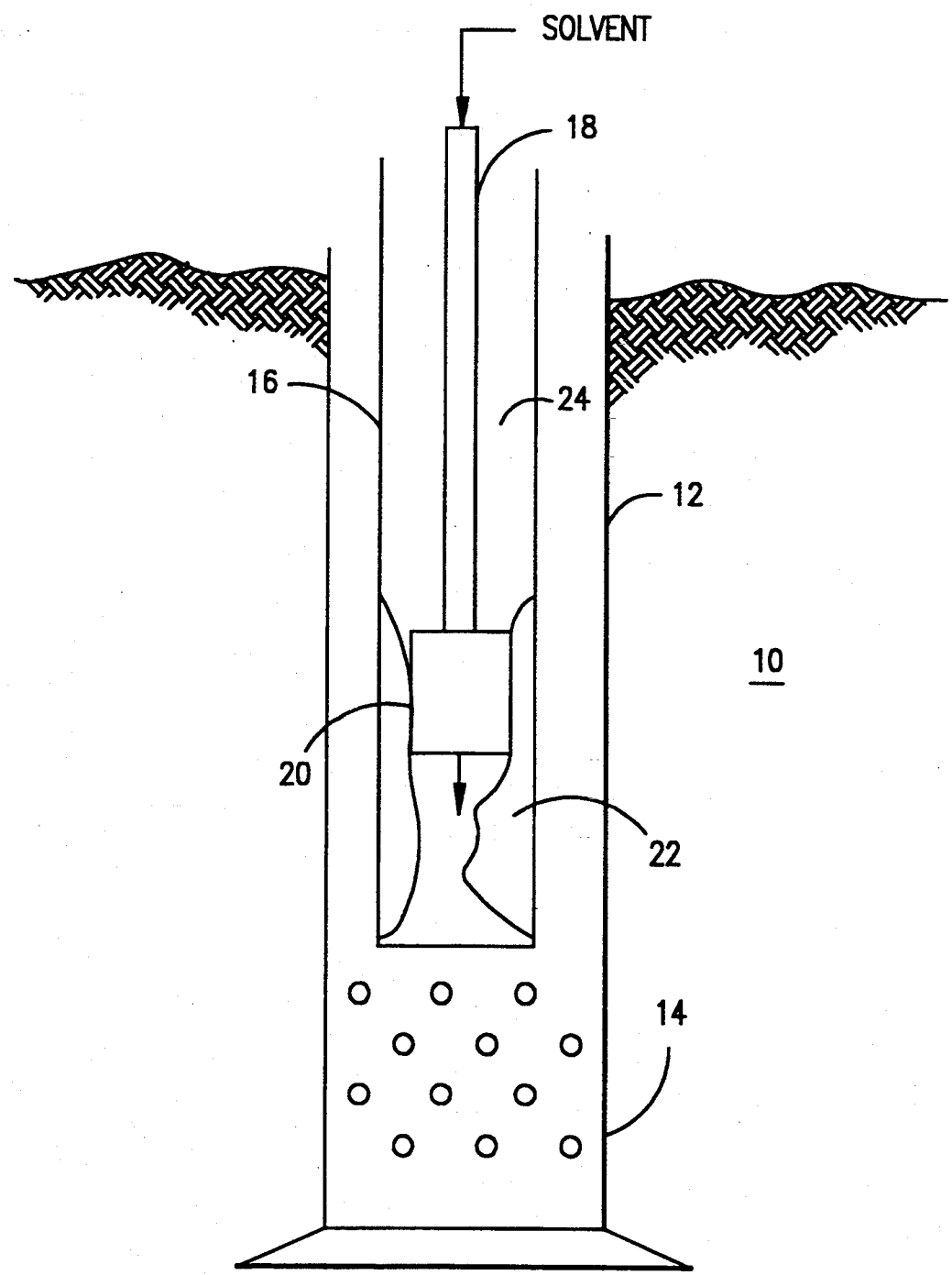

METHOD FOR REMOVING ALKALINE SULFATE SCALE IN DOWNHOLE TUBULARS

CROSS-REFERENCE TO RELATED APPLICATIONS

This application is a continuation-in-part of Ser. No. 08/096,249, filed Jul. 26, 1993, now abandoned.

FIELD OF THE INVENTION

This invention relates to a method for removing alkaline earth metal scale, particularly strontium and barium sulfate scale, from the interior surface of downhole production tubing using a high specific gravity scale-removing solvent in conjunction with milling the scale with a rotating mill head connected to a downhole motor.

BACKGROUND OF THE INVENTION

Many waters contain alkaline earth metal cations, such as barium, strontium, calcium, magnesium and anions, such as sulfate, bicarbonate, carbonate, phosphate and fluoride. When combinations of these anions and cations are present in concentrations which exceed the solubility product of the various species which may be formed, precipitates form until the respective solubility products are no longer exceeded. For example, when the concentrations of the barium and sulfate ions exceed the solubility product of barium sulfate, a solid phase of barium sulfate will form as a precipitate. Solubility products are exceeded for various reasons, such as evaporation of the water phase, change the pH, pressure or temperature and the introduction of additional ions which can form insoluble compounds with the ions already present in the solution.

As these reaction products precipitate on the surfaces of the water-carrying or water-containing system, they form adherent deposits or scale. Scale may prevent effective heat transfer, interfere with fluid flow, facilitate corrosive processes, or harbor bacteria. Scale is an expense problem in any industrial water system, in production systems for oil and gas, in pulp and paper mill systems, and in other systems, causing delays and shutdowns for cleaning and removal.

In our U.S. Pat. Nos. 4,980,077, 4,990,718, 5,049,297 and 5,084,105, there is disclosed a method for removing barium sulfate and other sulfate scales by a solvent comprising a combination of a chelating agent comprising a catalyst or synergist comprising polyaminopolycarboxylic acid such as EDTA or DTPA together with anions of (1) a monocarboxylic acid such as acetic acid, hydroxyacetic acid, mercaptoacetic acid or salicylic acid; (2) oxalates; (3) thiosulfates or (4) nitriloacetic acid. The scale is removed under alkaline conditions, preferably at pH values of about 8.0 to about 14.0, with best results being achieved at about pH 12. When the solvent becomes saturated with scale metal cations, the spent solvent is disposed of by re-injection into the subsurface formation or regenerated.

It is common practice when using scale dissolvers to pump a slug or volume of solvent into the well and leave it to stand static for a long period of time. This is not effective from an economic stand point because the well must be shut in for long periods of time, resulting in loss of production. Soaking is also not an efficient method from a reaction rate standpoint. Also, circulating scale solvent into the well bore is too costly, due to the large volume of solvent needed to fill the tubing and allow circulation.

The article by A. D. F. Brown, S. J. Merrett, and J. S. Putman, entitled "Coil-Tubing Milling/Underreaming of Barium Sulphate Scale and Scale Control in the Forties Field", published by the Society of Petroleum Engineers in 1991 discloses milling barium sulphate scale from the interior walls of downhole production tubing using coiled tubing with a downhole motor which rotates an underreamer and/or bit.

This invention provides an effective method for removing alkaline earth metal scales from the interior surface of downhole production tubing by circulating a scale-removing solvent into the production tubing while simultaneously milling the scale walls with a rotating working drill or mill head connected to a downhole motor.

SUMMARY OF THE INVENTION

A method for removing alkaline earth sulfate scale from the interior surface of downhole production tubing comprising contacting the scale with a solvent having a specific gravity of at least 1.2, while simultaneously milling the scale with a rotating working drill or mill head connected to a downhole motor. The solvent comprises an aqueous solution having a pH of about 8 to about 14 and a chelating agent comprising a polyaminopolycarboxylic acid present in a concentration of from 0.1M to 1.0M or salt of such an acid, and a synergist in the concentrative range of 0.1M to 1.0M. The preferred synergist or catalyst is the oxalate anion but other synergists may also be used including monocarboxylate acid, thiosulfate or nitriloacetic acid synergists.

BRIEF DESCRIPTION OF THE DRAWINGS

The figure schematically illustrates a method in accordance with this invention in which scale deposits are removed from the interior surface of downhole production tubing by contacting the scale with a solvent while simultaneously milling the scale walls with a rotating working drill or mill head connected to a downhole motor.

DESCRIPTION OF THE PREFERRED EMBODIMENT

According to the present invention, alkaline earth sulfate scales, especially barium sulfate, calcium sulfate and strontium sulfate scale, are removed from the interior surface of downhole production tubing by contacting the scale with an aqueous scale-removing solvent having a specific gravity of at least 1.2, while simultaneously milling the scale with a rotating working drill or mill head connected to a downhole motor. The scale itself is usually in the form of an adherent deposit of a scale-forming mineral on the interior surface of the downhole production tubing which has been exposed to water containing the scale-forming components. These components comprise alkaline earth metals including calcium strontium and barium, together with variable amounts of radium, depending upon the origin of the waters. Barium sulfate scale is particularly difficult to remove by existing chemical methods in view of its very low solubility.

The present invention removes the scale deposits on the interior surface of the downhole production tubing by contacting the scale with an aqueous solvent having a specific gravity of at least 1.2, while simultaneously milling the scale with a rotating working drill or mill head connected to coiled tubing. An aqueous solvent having a specific gravity of at least 1.2 is necessary to effectively suspend and remove the milled scale particles from the well bore. The aqueous solvent comprises a chelating agent and a catalyst or synergist to dissolve the scale as disclosed in U.S. Pat. No. 4,980,077, referenced above, which issued on Dec. 25, 1990 to J. M. Paul and R. L. Morris. This patent is hereby incorporated by reference. The pH of the solvent is maintained at pH values of about 8.0 to about 14.0, preferably at about 11 to 13, and preferably about 12. Suitable chelating agents comprise polyaminopolycarboxylic acid such as EDTA or DTPA which is intended to form a stable complex with the cation of the alkaline earth scale forming material. The chelant may be added to the solvent in the acid form or, alternatively, as a salt of the acid, preferably the potassium salt. The concentration of the chelant in the aqueous solvent should normally be in the range of 0.1M to 1.0M. The concentration of the catalyst or synergist in aqueous solvent will also be in the range of 0.1M to 1.0M. In any event the alkaline conditions used in the scale removal process will convert the free acid to the salt.

The preferred synergist or catalyst is the oxalate anion as described in our U.S. Pat. No. 4,980,077 referenced above. The oxalate is preferably used in an amount of about 0.1 to 1.0M, preferably about 0.5M, with a pH of 8.0 to 14.0, preferably 11 to 13, and usually about 12. The desired pH value is obtained by the addition of a base, preferably a potassium base such as caustic potash, potassium hydroxide. An alternative synergist or catalyst is a monocarboxylic acid anion, preferably salicylate, as described in our U.S. Pat. No. 5,084,105, referenced above, which issued Jan. 28, 1992, which patent is hereby incorporated by reference. The thiosulfate or nitriloacetic acid synergists described in our U.S. Pat. No. 5,049,297, referenced above, issued Sep. 17, 1992, may also be used which patent is hereby incorporated by reference. The amounts of the chelant used with the monocarboxylic acid and other synergists are comparable to the amounts used with the oxalate synergists and comparable solution pH volume are also used, i.e. chelant and synergist concentration from 0.1 to 1.0M, usually about 0.5M, solution pH from 8 to 14, usually 11 to 13 and for best results, about 12.

The preferred solvents comprise about 0.1 to about 1.0M of ethylenediaminetetraacetic acid (EDTA) or diethylenetriaminepentaacetic acid (DTPA), or salts of these acids, as a chelant. In addition, the preferred oxalate catalyst is added to the aqueous solution in about 0.1 to about 1.0, preferably about up to 0.5M. The pH of the solvent is then adjusted by the addition of a base to the desired value, preferably to about pH 12. We have found that it is important to avoid the use of sodium cations when operating at high pH values, about pH 8, and instead, to use potassium or, alternatively, cesium as the cation of the scale-removing agent. Potassium is preferred for economy as well as availability. Thus, the normal course of making up the solvent will be to dissolve the chelant and the oxalic acid (or potassium oxalate) in the water to the desired concentration, after which a potassium base, usually potassium hydroxide is added to bring the pH to the desired value of about 12.

The mode of operation of the synergist or catalyst is not presently understood. While not desiring to be bound to a particular theory concerning the actual mechanism of its activity in converting or dissolving the scale, it is believed that adsorption of the synergist or catalyst on the barium sulfate surface may modify the surface crystal structure in such a way that the barium in the modified crystal is easily removed by the chelating agent.

The drawing schematically illustrates a use of the present method. It shows a permeable subterranean formation 10 penetrated by the borehole of a well 12. The well contains a perforated casing 14. A production tubing 16 extends inside casing 14 to a point near the bottom of the oil formation 10. Coiled tubing 18 is pushed down inside the production tubing 16 onto which is attached a working drill or mill head 20 connected to a downhole motor (not shown). The drill or mill head 20 is rotated by the electric downhole motor attached to the coiled tubing 18. During production operations, barium sulphate scale 22 forms on the interior surface of the production tubing 16. Once the scale 22 forms sufficiently to reduce production of the well the well is shut in and coiled tubing 18 with the working drill or mill head 20 is lowered into the production tubing 16 to a point adjacent the scale. Suitable coil tubing is disclosed in an article by Martyn Beardsell, Mark Corrigan and Ken Newman, entitled "The Coiled Tubing Revolution", published by Reservoir Engineering in (date), which is incorporated by reference. A scale-removing solvent having a specific gravity of at least 1.2 is injected into the interior surface walls of the production tubing 16 containing the scale 22 from the bottom of mill head 20 via the coiled tubing while simultaneously milling the barium sulphate scale by the rotating mill head 20. The scale 22 is dissolved into the solvent and the solvent containing dissolved scale flows upward via the tubing annulus 24 and is carried to the top of the well for recovery. The solvent plays a dual role in the well: first, as a cooling fluid for the mechanical drill, and secondly as an efficient solvent for the milled scale cuttings released into the fluid. Some other advantages of the combination treatment includes: softening very hard scale before drilling, increased bit life, prevention of scale sloughing into the well and possible tool sticking, increased scale dissolution and removal of solids by circulation. The high specific gravity of the solvent also enhances the removal, by circulation, of heavy scale particles that are released by milling/drilling. Softening the scale before milling is also advantageous in order to prevent damage to downhole equipment, such as plugs and equipment, by milling over shots.

We claim:

1. A method for removing alkaline earth scale from the interior surface of production tubing in a well, said method consisting of:
   (a) lowering a mill head connected to a downhole motor into the production tubing to a point adjacent the scale and milling the scale by rotating the mill head to produce scale particles;
   (b) injecting a solvent comprising an aqueous solution having a specific gravity of at least 1.2, a pH of about 8 to about 14 and comprising a chelating agent comprising a polyaminopolycarboxylic acid or salt of such an acid present in a concentration of from 0.1M to 1.0 M, and a synergist in a concentration of from 0.1 to 1.0M into the scale in the vicinity of the rotating mill head to dissolve the scale from the production tubing, dissolve scale particles produced by the mill head, remove undissolved scale particles from the mill head and carry the dissolved and undissolved scale to the top of the well; and (c) recovering the solvent containing dissolved scale and undissolved scale particles from the production tubing.

2. A method according to claim 1 wherein the chelating agent comprises DTPA.

3. A method according to claim 1 wherein the chelating agent comprises EDTA.

4. A method according to claim 1 wherein the scale consists of barium, strontium or calcium sulfate and mixtures thereof and naturally occurring radioactive material (NORM), mainly radium 226 and radium 228.

5. A method according to claim 1 in which the synergist comprises a monocarboxylic acid anion.

6. A method according to claim 5 in which the monocarboxylic acid is salicylic acid or a substituted acetic acid.

7. A method according to claim 1 in which the synergist comprises oxalate anion.

8. A method according to claim 1 in which the synergist is selected from thiosulfate and nitriloacetate anions.

9. A method according to claim 1 in which the pH of the solvent is about 12.

10. A method according to claim 1 in which the solvent is brought to the pH of about 8 to about 14 by the addition of a potassium base.

11. A method according to claim 1 in which the scale is contacted with the solvent at a temperature from 25° C. to 100° C.

12. The method according to claim 1 wherein the downhole motor is connected to coiled tubing extended downhole inside the production tubing and the solvent is injected into the interior surface of the production tubing containing scale via the coiled tubing and mill head.

13. The method according to claim 1 wherein prior to step (b) the solvent is injected into the scale in the vicinity of the millhead and allowed to soak into the scale.

14. The method of claim 1 wherein solvent is injected into the production tubing and allowed to soak into the scale prior to lowering the mill head into the production tubing.

* * * * *